United States Patent
Attias et al.

(10) Patent No.: US 10,664,481 B2
(45) Date of Patent: May 26, 2020

(54) COMPUTER SYSTEM PROGRAMMED TO IDENTIFY COMMON SUBSEQUENCES IN LOGS

(71) Applicant: Cisco Technology, Inc., San Jose, CA (US)

(72) Inventors: Roberto Attias, Alameda, CA (US); Alberto Gonzalez Prieto, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 14/869,859

(22) Filed: Sep. 29, 2015

(65) Prior Publication Data

US 2017/0091190 A1    Mar. 30, 2017

(51) Int. Cl.
| | | |
|---|---|---|
| *G06F 16/2457* | (2019.01) | |
| *G06F 16/2455* | (2019.01) | |
| *G06F 16/17* | (2019.01) | |
| *G06F 16/33* | (2019.01) | |
| *G06F 16/2458* | (2019.01) | |
| *G06F 16/903* | (2019.01) | |
| *G06F 16/215* | (2019.01) | |
| *G06F 11/34* | (2006.01) | |

(Continued)

(52) U.S. Cl.
CPC .... *G06F 16/24578* (2019.01); *G06F 16/1727* (2019.01); *G06F 16/215* (2019.01); *G06F 16/2465* (2019.01); *G06F 16/24568* (2019.01); *G06F 16/3344* (2019.01); *G06F 16/90344* (2019.01); *G06F 11/3476* (2013.01); *G06F 17/40* (2013.01); *G06F 40/211* (2020.01); *G06F 40/284* (2020.01); *G06N 5/025* (2013.01)

(58) Field of Classification Search
CPC .................................................. G06F 17/3053
USPC ......................................................... 707/727
See application file for complete search history.

(56) References Cited

U.S. PATENT DOCUMENTS

| | | | | |
|---|---|---|---|---|
| 9,183,227 B2* | 11/2015 | Clinchant | ......... | G06F 17/30265 |
| 2008/0104431 A1* | 5/2008 | Shimada | ............... | G06F 1/3221 |
| | | | | 713/300 |

(Continued)

OTHER PUBLICATIONS

European Patent Office, "Search Report" in application No. PCT/US2016/049514, dated Apr. 3, 2018, 12 pages.

(Continued)

*Primary Examiner* — Kris E Mackes
*Assistant Examiner* — Allen S Lin
(74) *Attorney, Agent, or Firm* — Lee & Hayes, P.C.

(57) ABSTRACT

A data processing method includes receiving a stream of digital data with a plurality of objects and, in response to receiving an object, tokenizing the object to create a tokenized object, and storing the tokenized object in a token database. The method further includes comparing the tokenized object to a plurality of other tokenized objects stored in the token database, computing a pattern associated with the tokenized object, storing the pattern in a pattern database, and managing a size of the pattern database by identifying, a subset of patterns that are eligible for deletion from the pattern database based on an age of each pattern, ranking each pattern of the subset based on a quality and a popularity metric, identifying, based on the ranking and from the subset, a second pattern and deleting the second pattern from the pattern database to produce an updated database.

17 Claims, 6 Drawing Sheets

(51) Int. Cl.
　　　*G06N 5/02*　　　(2006.01)
　　　*G06F 17/40*　　　(2006.01)
　　　*G06F 40/211*　　(2020.01)
　　　*G06F 40/284*　　(2020.01)

(56) References Cited

U.S. PATENT DOCUMENTS

| | | | |
|---|---|---|---|
| 2013/0091143 A1* | 4/2013 | Raemy | G06Q 10/06395 707/748 |
| 2013/0191069 A1* | 7/2013 | Ravindran | G01C 22/006 702/160 |
| 2014/0095324 A1* | 4/2014 | Cabral | G06Q 30/08 705/14.71 |
| 2015/0032738 A1* | 1/2015 | Nachnani | G06F 17/30554 707/723 |
| 2015/0089309 A1* | 3/2015 | Fu | G06F 11/0724 714/57 |
| 2016/0063065 A1* | 3/2016 | Khatri | G06F 17/30867 707/723 |
| 2016/0321544 A1* | 11/2016 | Hassanzadeh | G06N 5/022 |

OTHER PUBLICATIONS

European Claims in application No. PCT/US2016/049514, dated Apr. 2018, 4 pages.

* cited by examiner

COMPUTER SYSTEM PROGRAMMED TO IDENTIFY COMMON SUBSEQUENCES IN LOGS

TECHNICAL FIELD

The present disclosure generally relates to improved methods, computer software and computer hardware in the field of network management. The disclosure relates more specifically to improved computer-based management of logs and/or other information arriving simultaneously from multiple sources in multiple unknown formats.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks are ever growing in their size and complexity. Every day, an unfathomable amount of information is sent within individual networks, and from network to network. Typically, any given computer network involves many different components interacting together. These components may involve many different types and/or versions of hardware components and many different types and/or versions of software applications that may execute on the hardware components. Each component may generate large amounts of data, in the form of logs or otherwise, in any number of formats. This data is challenging to manage at the scale that many corporations and professionals encounter on a daily basis.

DESCRIPTION OF EXAMPLE EMBODIMENTS

Figure 1:
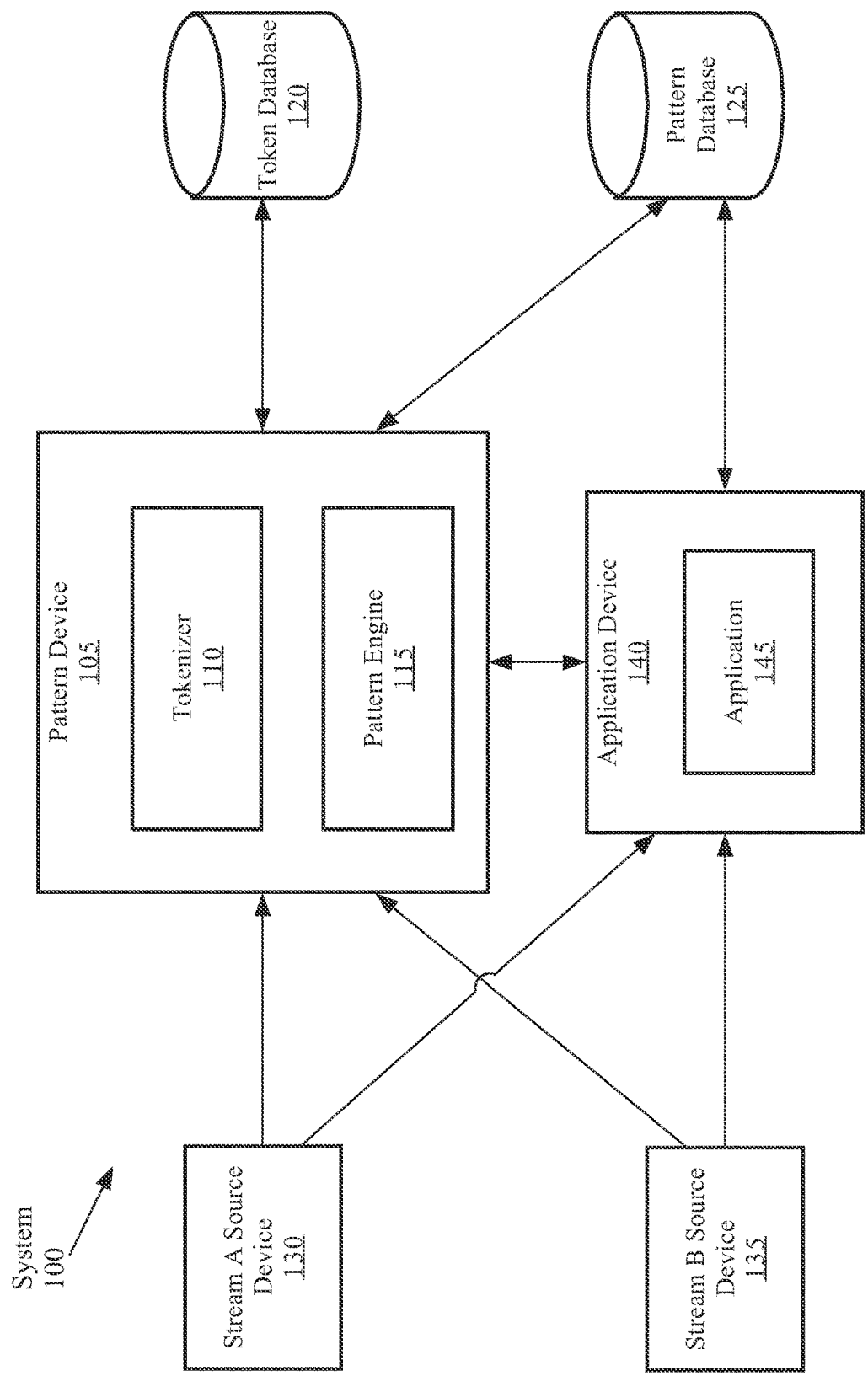
FIG. 1 shows a block diagram of a system in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for log common subsequence discovery including computer systems that are programmed to identify common subsequences in digitally stored logs, log files, or other suitable files. In one embodiment, a stream of digital data comprising a plurality of objects is received. In response to receiving a first object of the plurality of objects, the first object is tokenized to create a first tokenized object and the first tokenized object is stored in a token database that comprises a plurality of other tokenized objects. The first tokenized object is compared to the plurality of other tokenized objects stored in the token database, a first pattern associated with the first tokenized object is computed, and storing the first pattern in a pattern database that comprises a plurality of patterns. A size of the pattern database is managed by: identifying, from the plurality of patterns, a subset of patterns eligible for deletion from the pattern database based on an age of each pattern, ranking each pattern of the subset based on a quality metric and a popularity metric, identifying, based on the ranking and from the subset, a second pattern, and deleting the second pattern from the pattern database.

In one embodiment, a size of a pattern database is managed by: identifying, from a plurality of patterns, a subset of patterns eligible for deletion from the pattern database based on an age of each pattern, ranking each pattern of the subset based on a quality metric and a popularity metric, identifying, based on the ranking and from the subset, a second pattern, and deleting the second pattern from the pattern database.

In one embodiment, a stream of data comprising a plurality of objects is received. In response to receiving a first object of the plurality of objects, the first object is tokenized to create a first tokenized object, and the first tokenized object is stored in a token database that comprises a plurality of other tokenized objects. The first tokenized object is compared to the plurality of other tokenized objects stored in the token database, a first pattern associated with the first tokenized object is computed, and the first pattern is stored in a pattern database that comprises a plurality of patterns, wherein the plurality of patterns comprises a set of hierarchical patterns. An indication is received from an application that the set of hierarchical patterns matched an input, wherein a pattern from the set of hierarchical patterns with a largest hit count is selected as a hit. In response, a hit count associated with each pattern of the set of hierarchical patterns is increased. When deleting a pattern of the set of hierarchical patterns from the pattern database: deleting a more specific pattern of the set of hierarchical patterns when the more specific pattern comprises a first hit count below a first threshold relative to a second hit count of a more general pattern of the set of hierarchical patterns and the second hit count is below a second threshold relative to a total sum of all hit counts in the pattern database, or deleting the more general pattern if the more specific pattern is not deleted.

In one embodiment, an indication is received from an application that a set of hierarchical patterns matched an input, wherein a pattern from the set of hierarchical patterns with a largest hit count is selected as a hit. In response, a hit count associated with each pattern of the set of hierarchical patterns is increased. When deleting a pattern of the set of hierarchical patterns from a pattern database: deleting a more specific pattern of the set of hierarchical patterns when the more specific pattern comprises a first hit count below a first threshold relative to a second hit count of a more general pattern of the set of hierarchical patterns and the second hit count is below a second threshold relative to a total sum of all hit counts in the pattern database, or deleting the more general pattern if the more specific pattern is not deleted.

Example System Implementation

FIG. 1 illustrates an example computer system 100 in which the techniques described may be practiced, according to some embodiments. System 100 is a computer-based system and may be implemented as a network management station or integrated with a larger network management system. The various components of system 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes pattern device 105, tokenizer 110, pattern engine 115, token database 120, pattern database 125, stream A source device 130, stream B source device 135, application device 140, and application 145. In one embodiment, pattern device 105 is any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although depicted as a single device, pattern device 105 may include multiple devices in one or more locations. Pattern device 105 is communicatively connected to token database 120, pattern database 125, stream A source device 130, stream B source device 135, and/or application device 140 using any suitable combination of wired and/or wireless communication. Pattern device 105 includes programming to receive data streams, such as from stream A source device 130, stream B source device 135, and/or any other suitable source. The data streams may be received in any suitable manner, and the formats of the data streams may be known or unknown. Pattern device 105 executes tokenizer 110 and pattern engine 115.

In one embodiment, tokenizer 110 comprises program instructions that are configured to tokenize individual objects within a data stream that is received by pattern device 105. Tokenizer 110 may be programmed to tokenize any suitable individual objects from a data stream. In general, tokenizer 110 is able to tokenize strings of text. For example, the objects may be individual lines of text from a log, text from emails, books, or other suitable sources. Tokenizer 110 may be programmed to tokenize text in any suitable manner, including, but not limited to: using spaces as token separators, recognizing substrings (such as dates, etc.) as tokens, or any other method of dividing strings into a sequence of tokens according to one or more rules. The output of tokenizer 110 is used by pattern engine 115, and is stored in token database 120, as discussed below.

In one embodiment, token database 120 is any suitable data store, including any of a relational database, non-SQL database, or other data repository that is electronically digitally stored in a storage device such as one or more hard disk drives, memories, or any other electronic digital data recording device configured to store data. In an embodiment, token database 120 stores tokenized objects. Although token database 120 is depicted as a single device in FIG. 1, token database 120 may span multiple devices located in one or more physical locations. Additionally, in one embodiment, token database 120 may be located on the same device(s) as pattern device 105 and/or application device 140. Alternatively, token database 120 may be located on a separate device(s) from pattern device 105 and/or application device 140. Token database 120 may store any tokens generated by tokenizer 110. Specifically, token database 120 may be a fixed size circular buffer. The fixed size may be any suitable amount, such as 100 tokenized objects. Thus, when token database 120 reaches the fixed size, the oldest tokenized object is deleted in favor of a new tokenized object. Optionally, the fixed size may be changed dynamically, such as in response to changing application needs or resources.

When determining a fixed size for the token database 120, the size should be large enough that there are enough other objects to produce meaningful patterns, while simultaneously keeping the size small enough to not create unacceptable processing delays. The fixed size for token database 120 may be any size. Depending on the specific use case, the fixed size may be larger or smaller. For example, if the system is being used for an offline process, the fixed size may be larger, such as 50, 100, 500, 1000, etc. Alternatively, if the system is being used for a real time process, the fixed size may be smaller, such as 20, 50, 100, etc., because the increased processing time is unacceptable for a real time environment. Any suitable element of FIG. 1 may manage the token database, such as tokenizer 110, pattern engine 115, database management software (not shown), etc. Managing the size of token database 120 is useful because computer execution of a longest subsequence match algorithm, discussed below and used to compute patterns, can be resource intensive. The longest subsequence match algorithm is resource intensive because each new tokenized object is compared to every other tokenized object stored in token database 120, and may potentially result in a match, which in turn may produce many different patterns. Without management of the size of token database 120, at scale, the execution time of the longest subsequence match algorithm would become prohibitively long, if not impossible. Managing the size of the token database 120 greatly improves the efficiency and effectiveness of the computing devices discussed herein.

In one embodiment, pattern database 125 is any suitable storage device such as one or more hard disk drives, memories, or any other electronic digital data recording device configured to store data. Specifically, pattern database 125 stores patterns as computed by pattern engine 115, discussed below. Additionally, pattern database 125 may store additional data related to patterns, such as an age of a pattern(s), a quality of a pattern(s) (such as a number, ratio, or other measurement indicating how generic or specific a pattern is), a popularity of a pattern(s), any relationships of the pattern (such as whether the pattern is in a hierarchy of related patterns), and/or any other data or metadata relating to patterns. Although pattern database 125 is depicted as a single device in FIG. 1, pattern database 125 may span multiple devices located in one or more physical locations. Additionally, in one embodiment, pattern database 125 may be located on the same device(s) as pattern device 105 and/or application device 140. Alternatively, pattern database 125 may be located on a separate device(s) from pattern device 105 and/or application device 140. Like token database 120, pattern database 125 may also have a fixed size. The fixed size may be any suitable amount, such as 500 patterns. However, unlike token database 120, the oldest pattern is not automatically deleted. Rather, a pattern is selected for deletion as discussed below, based on a variety of factors.

When determining a fixed size for the pattern database 125, the size should be large enough that there are enough patterns to produce meaningful matches with data, while simultaneously keeping the size small enough to not create unacceptable processing delays. Depending on the specific use case, the fixed size may be larger or smaller. For example, if the system is being used for an offline process, the fixed size may be large, such as 4000. Alternatively, if the system is being used for a real time process, the fixed size may be small, such as 1000, because the increased processing time is unacceptable for a real time environment. Managing the size of pattern database 125 is useful because when an application is comparing data to the patterns in pattern database 125, the data is compared to each pattern in the database. Without management of the size of pattern database 125, at scale, the execution time of the pattern comparisons would become prohibitively long, if not impossible. Managing the size of the pattern database 125 greatly improves the efficiency and effectiveness of the computing devices discussed herein.

In one embodiment, pattern engine 115 comprises program instructions that are configured to compute patterns, manage a pattern database, track pattern age, track pattern popularity, determine pattern quality, and determine patterns to delete from the pattern database. Pattern engine 115 may compute patterns in any suitable manner. Specifically, pattern engine 115 uses a longest subsequence match algorithm to compare a newly stored tokenized object against every other tokenized object stored in token database 120. Thus, pattern engine 115 is able to compute a pattern in the form of a regular expression that matches both objects (i.e., the newly stored object and a matching tokenized object from the token database 120). For example, given the log lines:

Mar 26 23:00:56 rockies kernel: [3046114.128380] NVRM: Xid (PCI:0000:83:00): 13, Graphics Exception: ESR 0x51ce48=0x1f000e 0x51ce50=0x4 0x51ce44=0x13eff2 0x51ce4c=0x7f
and
Mar 26 23:00:56 rockies kernel: [3046114.748201] NVRM: Xid (PCI:0000:83:00): 13, Graphics Exception: ESR 0x51d648=0x1f000e 0x51d650=0x4 0x51d644=0x13eff2 0x51d64c=0x7f
the computed pattern may be:
Mar 26 23:00:56 rockies kernel: [3046114.748201] NVRM: Xid (PCI:0000:83:00): 13, Graphics Exception: ESR.+=0x1f000e.+=0x4.+=0x13eff2.+=0x7f
where .+ identifies a subsequence(s) that are different in the two original log lines. The above example assumes a simple space-based tokenization and, in the case that a different tokenization rule(s) is used, the result may be different for the same two log lines. Any longest subsequence match algorithm may be used to determine patterns. Additionally, more than one pattern may be computed for a given tokenized object. For example, a tokenized object may match 5 or more other tokenized objects in the token database, at varying levels of specificity, and each match may result in a different pattern.

In one embodiment, pattern engine 115 includes programming to manage a pattern database, such as pattern database 125. Specifically, a size of the pattern database 125 may be managed. Managing the size of the pattern database 125 may include tracking pattern age, tracking pattern popularity, determining pattern quality, determining which patterns to delete, and any other suitable steps. In one embodiment, pattern engine 115 includes programming to track pattern age. Pattern age may be used as one of the factors in determining which pattern to delete from the pattern database 125. The age of a given pattern may be defined in any suitable manner, such as a time since the pattern was stored in the database. Alternatively, the age of a given pattern may be defined relative to the amount of patterns in a database. Specifically, pattern engine 115 may calculate which patterns are eligible for deletion based on the age of the patterns, such as through a grace period. The grace period may be any suitable amount of time, such as an amount of time in hours, days, etc., or may be based on the number of patterns added to the database since the given pattern was added and/or a total number of allowed patterns in the database. For example, if there is a limit of 500 patterns in a pattern database, and a grace period of 10%, then a pattern may be eligible for deletion (i.e., not in the grace period) once 50 new patterns have been added to the database, after the given pattern was stored.

In one embodiment, pattern engine 115 includes programming to track pattern popularity based on feedback from applications (such as application 140) accessing the pattern database 125. Popularity may be a hit count that corresponds to how many times a given pattern was a match to data used by an application. Thus, when pattern engine 115 receives feedback from an application, the hit count of the associated patterns is increased by 1, or any other suitable amount. The application may be any application, and may provide feedback in any suitable manner. The popularity may be application specific, or may be shared across multiple applications accessing the same pattern database.

In one embodiment, the popularity of pattern i at time n may be computed using the following: $P\_i[n]=sum(j=0, \ldots n)(h\_i[j]*w[j-n])$, wherein $h\_i[j]$ is 1 when pattern i matched log j and 0 otherwise, and where w is a window function for controlling how recent the hits for pattern i are. The window function may be any window function $w[m]$ such that $w[m]=0$ for all $m>0$, such as the following rectangular window: $rect\_window[m]=1$ if $-100<=m<=0$. A rectangular window gives the same weight to the last X objects. Other window functions may be used, such as triangular windows, linear combinations of triangular windows and rectangular windows, and/or any other suitable window. Alternatively, no window function may be used.

In one embodiment, pattern engine 115 includes programming to determine the quality of patterns. The quality of a pattern may be determined based on any suitable metric. One such metric is using the length of a constant sequence within the pattern. For example, in the pattern "abc.+def" where ".+" is a sequence that differs, the quality would be 6, as the length of "abc" and "def" is 6. As another example, a ratio between a length of a constant sequence vs a total length of the pattern may be used. Many other quality metrics may be used.

In one embodiment, pattern engine 115 includes programming to determine which pattern(s) to delete from pattern database 125. Initially, pattern engine 115 may identify which patterns from the pattern database are eligible to be considered for deletion based on their age, as discussed above. Thus, for example, if a pattern is not in a grace period, the pattern is eligible for deletion. Pattern engine 115 may then rank the eligible patterns based on their popularity and quality. For example, one ranking may be "quality*popularity." Any suitable combination of popularity and/or quality may be used to rank the eligible patterns. Then, based on the ranking, pattern engine 115 selects the pattern with the lowest ranking (i.e., the least quality and/or popularity) for deletion. Pattern engine 115, or other suitable component, may then delete the selected pattern.

In one embodiment, pattern engine 115 includes programming to determine which pattern to delete when there are hierarchical patterns. Hierarchical patterns occur when an object that matches pattern i also matches patterns j, k, etc. For example, consider the patterns: ".+" and "abc.+def" which both match the input: "abc123def." In this example, if one of the hierarchical patterns need to be deleted, a decision must be made as to which to delete. Pattern engine 115 may determine which pattern of a set of two hierarchal patterns, P1 and P2, to delete based on the following:

where P1 is more specific than P2 (i.e., quality of P1>quality of P2), n1=number of hits (popularity) for P1, n2=number of hits (popularity) for P2, and L=total number of hits across all patterns:

Forget P1 if:

n1<a*n2, where a is (0, 1] AND n2<b*L, where b is (0, 1].

Otherwise, forget P2. In the above example, the values for a and b may be any amount, and may vary based on any suitable factors. To describe the above example in another way, pattern engine 115 deletes the more specific pattern if the more specific pattern has considerably fewer hits than the more general pattern if the general pattern also is not too close to the total number of lines (i.e., the general pattern is not too generic.) Pattern engine 115 may make a determination to delete hierarchical patterns at any time, and the determination need not be in response to the pattern database exceeding a threshold size.

In one embodiment, stream A source device 130 and stream B source device 135 are any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, network infrastructure devices, and the like. Stream A source device 130 and stream B source device 135 may provide one or more data streams to pattern device 105 and/or application device 140. The data streams may be in any format, whether known or unknown to pattern device 105 and/or application device 140. Specifically, the data streams are typically in an unknown format, as one advantage of the invention is that knowing the format of information within a data stream is not required. The data streams may represent any type of information, such as logs, emails, and/or any other text-based data. Although two source devices are shown in FIG. 1, any number of source devices may be present.

In one embodiment, application device 140 is any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although depicted as a single device application device 140 may include multiple devices in one or more locations. Application device 140 is communicatively connected to pattern device 105, pattern database 125, stream A source device 130, and/or stream B source device 135 using any suitable combination of wired and/or wireless communication. Application device 140 includes programming to receive data streams, such as from stream A source device 130, stream B source device 135, and/or any other suitable source. The data streams may be received in any suitable manner. Application device 140 executes application 145.

In one embodiment, application 145 is any application, software, or other executable instructions representing a stored program. As an example, application 145 may be a web browser, productivity software, a file compression application, etc. Application 145 includes programming to access pattern database 125 to compare received data, such as from stream A source device 130 and/or stream B source device 135, to identified patterns in the database. In response to finding a match, application 145 sends feedback to pattern engine 115, so that the popularity of the match may be increased in pattern database 125. The feedback may be sent in any manner, and may take any suitable form. In one embodiment, in the event that multiple matches are found for a given data object (i.e., hierarchical patterns are found), the most specific pattern is selected as the hit, or match, and feedback is provided to increase the popularity of all matches.

Example Functional Implementation

Figure 2A:
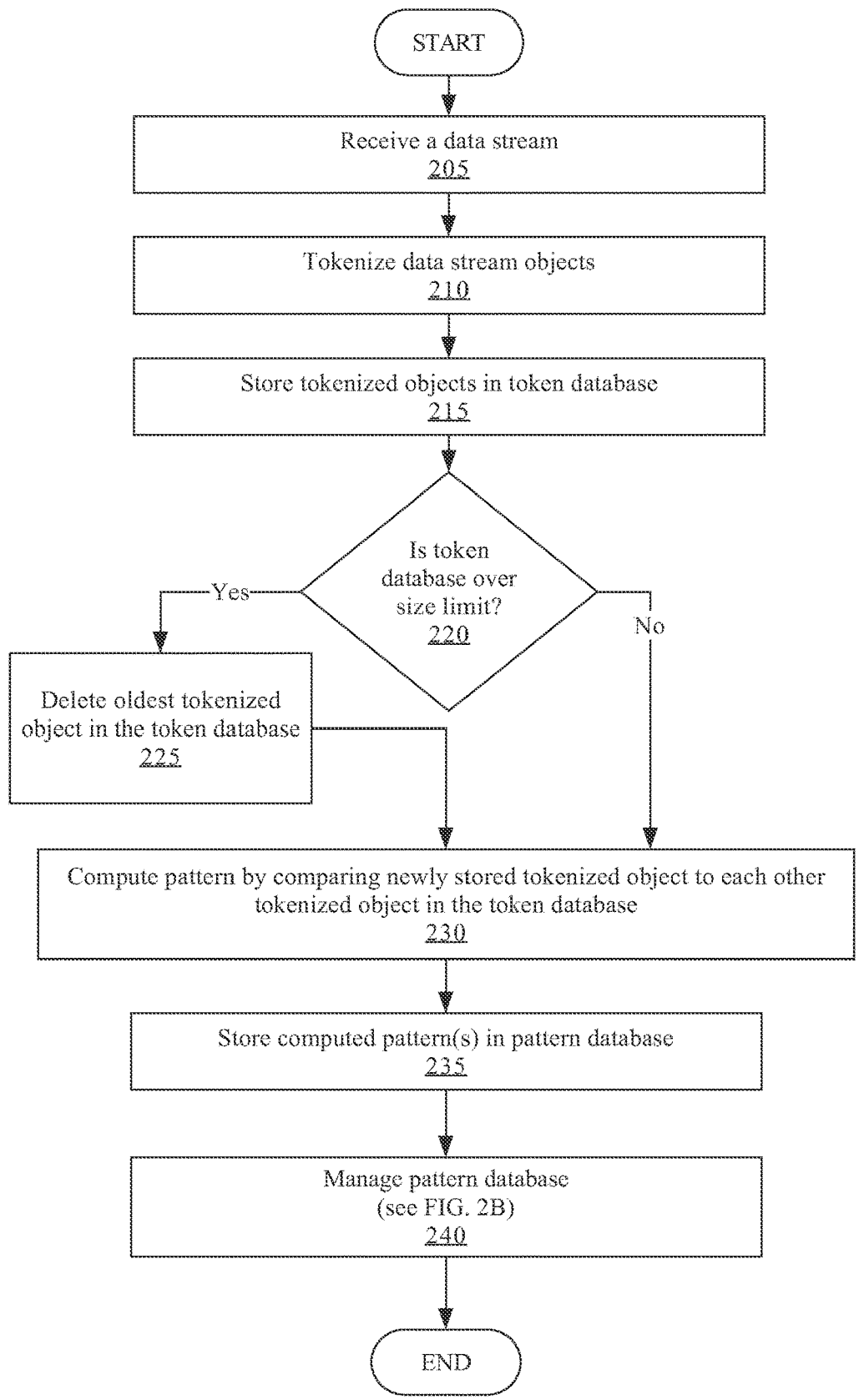
FIG. 2A and FIG. 2B show flowcharts of a method in accordance with an embodiment of the invention.
Figure 2B:
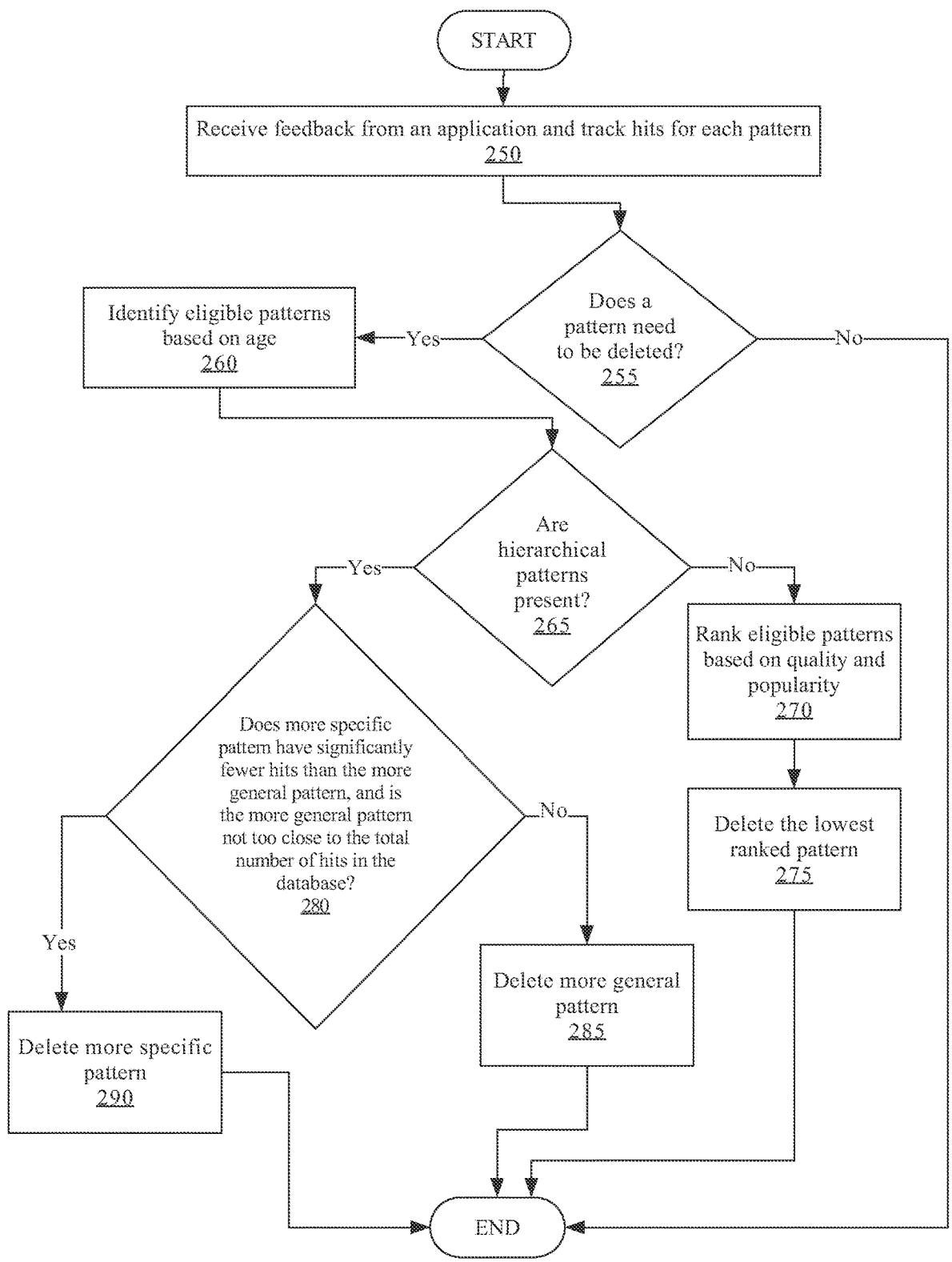

FIG. 2A and FIG. 2B show an example flowchart of a method for log common subsequence discovery. Although the steps in FIG. 2A and FIG. 2B are shown in an order, the steps of FIG. 2A and FIG. 2B may be performed in any order, and are not limited to the order shown in FIG. 2A and FIG. 2B. Additionally, some steps may be optional, may be performed multiple times, and/or may be performed by different components. In one embodiment, the steps shown in FIG. 2A and FIG. 2B may be performed in parallel. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

Beginning with FIG. 2A, in step 205 a data stream is received. The data stream may be received in any suitable manner, from any source. Any number of separate data streams may be received in step 205. Further, the data streams may be received continuously, and are not limited to being received in the single step depicted in FIG. 2A. In one embodiment, the format of the data stream(s) is not known. The data stream(s) may contain any type or amount of data. Specifically, the data stream(s) contain text data in the form of strings, but the invention should not be limited to this example. Each data stream may have any number of objects, representing portions of the data of the stream. For example, the objects may be a line of text, a paragraph, a sentence, and/or any other identifiable amount of data.

In step 210, data stream objects are tokenized. The data stream objects may be tokenized in any suitable manner, based on one or more rules. For example, the data stream objects may be tokenized based on, but is not limited to: spaces, semicolons, periods, commas, and/or any combination of these elements.

In step 215, the tokenized objects are stored in the token database. The tokenized objects may be stored in the token database in any suitable format.

In step 220, a determination is made whether the token database is over a size limit. The size limit may be set to any size, such as 50 tokenized objects, 100 tokenized objects, or any other amount. Alternatively, the size limit may be based on storage space, or any other suitable metric. In one embodiment, the token database is a fixed size circular buffer. If the token database is not over the size limit, the method proceeds to step 230. If the token database is over the size limit, the method proceeds to step 225.

In step 225, the oldest tokenized object is deleted from the token database. The oldest tokenized object may be tracked in any manner. Additionally, the oldest tokenized object may be deleted in any manner.

In step 230, a pattern is computed by comparing the newly stored tokenized object to each other tokenized object in the token database. The pattern may be generated using a longest common subsequence algorithm. Any suitable longest common subsequence algorithm may be used. Any number of patterns may be generated in step 230.

In step 235, the computed pattern(s) is stored in the pattern database. The computed pattern(s) may be stored in any suitable manner.

In step 240, the pattern database is managed. The size of the pattern database may be maintained below a threshold, such as 7000 patterns, or any other suitable amount. The size may be based on a variety of factors, such as available resources, application usage and/or application constraints, or any other suitable factor. Additionally, any other aspects of the pattern database may be managed. The specifics of step 240 are addressed in detail in FIG. 2B.

Turning to FIG. 2B, in step 250 feedback is received from an application and the hits for each pattern are tracked. The feedback may be received from the application in any manner and/or any format. In one embodiment, the feedback from multiple applications may be aggregated together. Alternatively, feedback from different applications is kept separate. The hits, or popularity, for each pattern may be tracked in any manner, such as a counter, etc.

In step 255, a determination is made whether a pattern needs to be deleted. The determination may be made in any manner and may be based on any suitable factors, such as whether the size of the pattern database exceeds a threshold, such as 3000 patterns. Alternatively, the size may be based on the amount of space, such as in megabytes, etc. If no pattern needs to be deleted, the method ends. If a pattern does need to be deleted, the method proceeds to step 260.

In step 260, eligible patterns for deletion are identified based on age. In one embodiment, the eligible patterns are outside of a grace period. The grace period is based on the age of the pattern. The age of a pattern may be a time amount, such as minutes, hours, etc., or may be defined relative to the size of the pattern database, or any other standard. For example, if a pattern database may hold up to 3000 patterns, then the age of a pattern may be defined by the amount of patterns added to the database after the given pattern was added. Thus, if the grace period is 10%, or 300 new patterns in this example, the given pattern would be eligible for deletion after 300 patterns newer than the given pattern have been added to the pattern database.

In step 265, a determination is made whether hierarchical patterns are present. The determination made in step 265 may be made at any other point in FIG. 2B, and should not be limited to the location depicted in FIG. 2B. For example, the determination may be made after identifying the lowest ranking pattern (such as step 275). Alternatively, the determination may be made at step 250, if feedback is received indicating that multiple patterns were a match, which means that hierarchical patterns are present. The determination may be made in any manner. If there are hierarchical patterns present, the method proceeds to step 280. If there are not hierarchical patterns present, the method proceeds to step 270.

In step 270, eligible patterns are ranked based on quality and popularity. The quality metric used to rank patterns may be any suitable metric, such as length of the constant sequence in the pattern, etc. Similarly, the popularity metric used to rank patterns may be any suitable metric, such as a hit count, which may or may not utilize a window, or any other measure of popularity. Ranking the eligible patterns may involve generating a score, such as by using quality*popularity as a formula, or other suitable combination of quality and popularity. Alternatively, the patterns may be ranked in any other manner.

In step 275, the lowest ranked pattern is deleted. The lowest ranked pattern is the pattern with the least quality and/or popularity. This pattern is selected for deletion because it has the least overall value in the database, and the new pattern that will replace the lowest ranked pattern might be more valuable. The lowest ranked pattern may be deleted in any suitable manner.

In step 280, a determination is made whether the more specific pattern has significantly fewer hits than the more general pattern, and whether the more general pattern is not too close to the total number of hits in the database. Any suitable standards may be used for "significantly fewer hits" and "not too close." In one embodiment, the formulas used may be: $n1 < a*n2$ and $n2 < b*L$, respectively, where n1 is the number of hits for pattern 1, n2 is the number of hits for pattern 2, pattern 1 is more specific than pattern 2, a is a positive constant less than 0.5, and b is a positive constant less than 1. Alternatively, any other suitable formula may be used.

In step 285, the more general pattern is deleted. The more general pattern may be deleted in any suitable manner.

In step 290, the more specific pattern is deleted. The more specific pattern may be deleted in any suitable manner.

Second Example Functional Implementation

Figure 3:
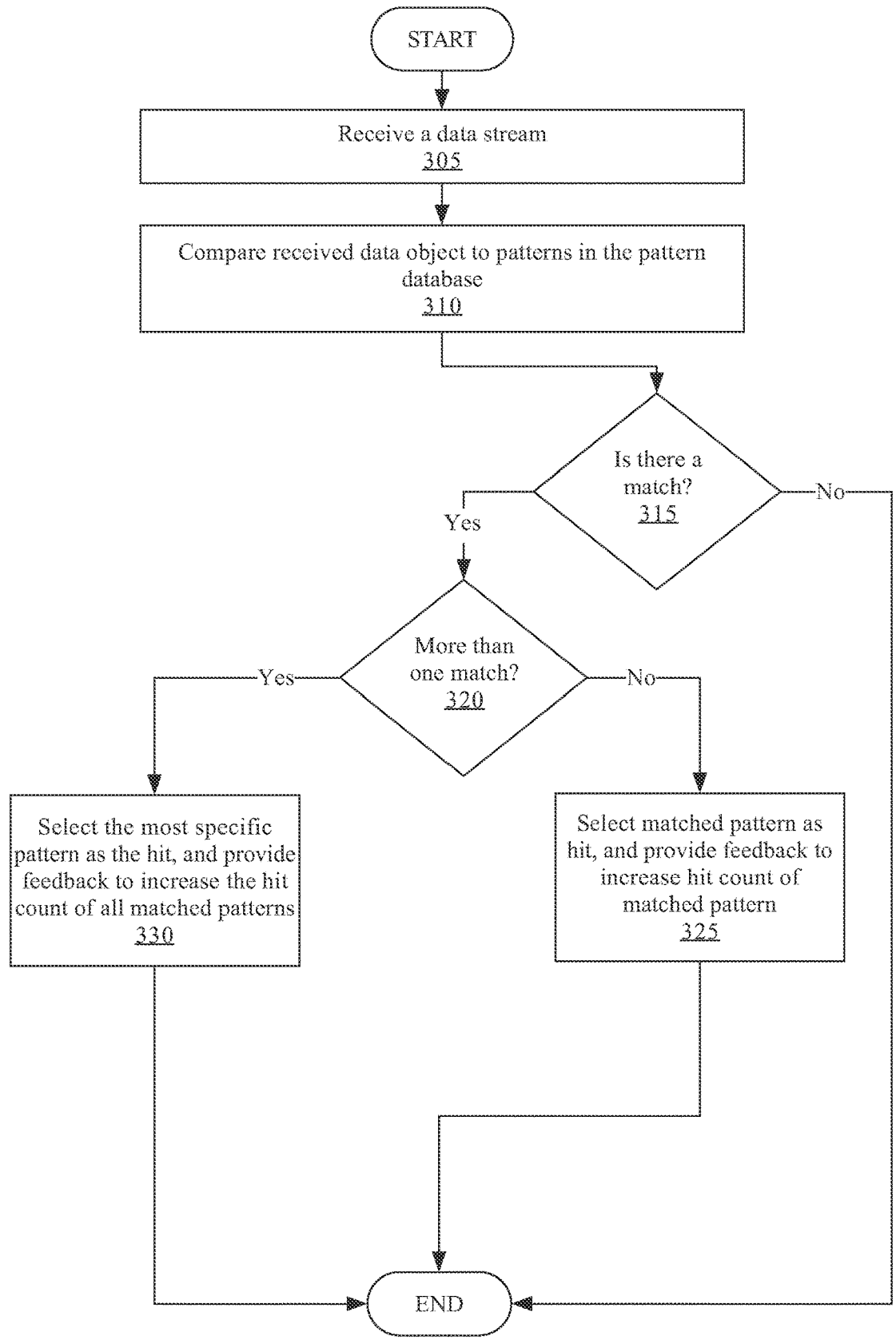
FIG. 3 shows a flowchart of a method in accordance with an embodiment of the invention.

FIG. 3 shows an example flowchart of a method for log common subsequence discovery. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components. In one embodiment, the steps shown in FIG. 3 may be performed in parallel.

In step 305, a data stream is received. The data stream may be received in any suitable manner, from any source. Any number of separate data streams may be received in step 305. Further, the data streams may be received continuously, and are not limited to being received in the single step depicted in FIG. 3. In one embodiment, the format of the data stream(s) is not known. The data stream(s) may contain any type or amount of data. Specifically, the data stream(s) contain text data in the form of strings, but the invention should not be limited to this example. Each data stream may have any number of objects, representing portions of the data of the stream. For example, the objects may be a line of text, a paragraph, a sentence, and/or any other identifiable amount of data.

In step 310, a received data object is compared to patterns in the pattern database. The received data objects may be compared to patterns in the pattern database in any manner. The received data object may be compared to every pattern in the pattern database, and may result in multiple matches.

In step 315, a determination is made whether there is a match. The determination may be made in any manner. If there is not a match, the method ends. If there is a match, the method proceeds to step 320.

In step 320, a determination is made whether there is more than one match. The determination may be made in any manner. If there is more than one match, the method proceeds to step 330. If there is not more than one match, the method proceeds to step 325.

In step 325, the matched pattern is selected as a hit, and feedback is provided to increase the hit count of the matched pattern. The feedback is provided in any manner, and indicates to the application managing the pattern database that the popularity of the matched pattern should be increased. Subsequently, the application may take any type of action based on the match. For example, the application may send a message or alert, replace text based on the pattern, etc. Any type of action may be taken by the application, and the type of action taken may be based on the type of application and/or use for which the data is being compared.

In step 330, the most specific pattern is selected as the hit, and feedback is provided to increase the hit count of all matched patterns. The determination as to which of the patterns is the most specific may be based, for example, on the quality metric, on a constant length within the pattern, or any other factor(s). The feedback is provided in any manner, and indicates to the application managing the pattern database that the popularity of all the matched patterns should be increased. Subsequently, the application may take any type of action based on the hit. For example, the application may send a message or alert, replace text based on the pattern, etc. Any type of action may be taken by the application, and the type of action taken may be based on the type of application and/or use for which the data is being compared.

Example Use Case

Figure 4:
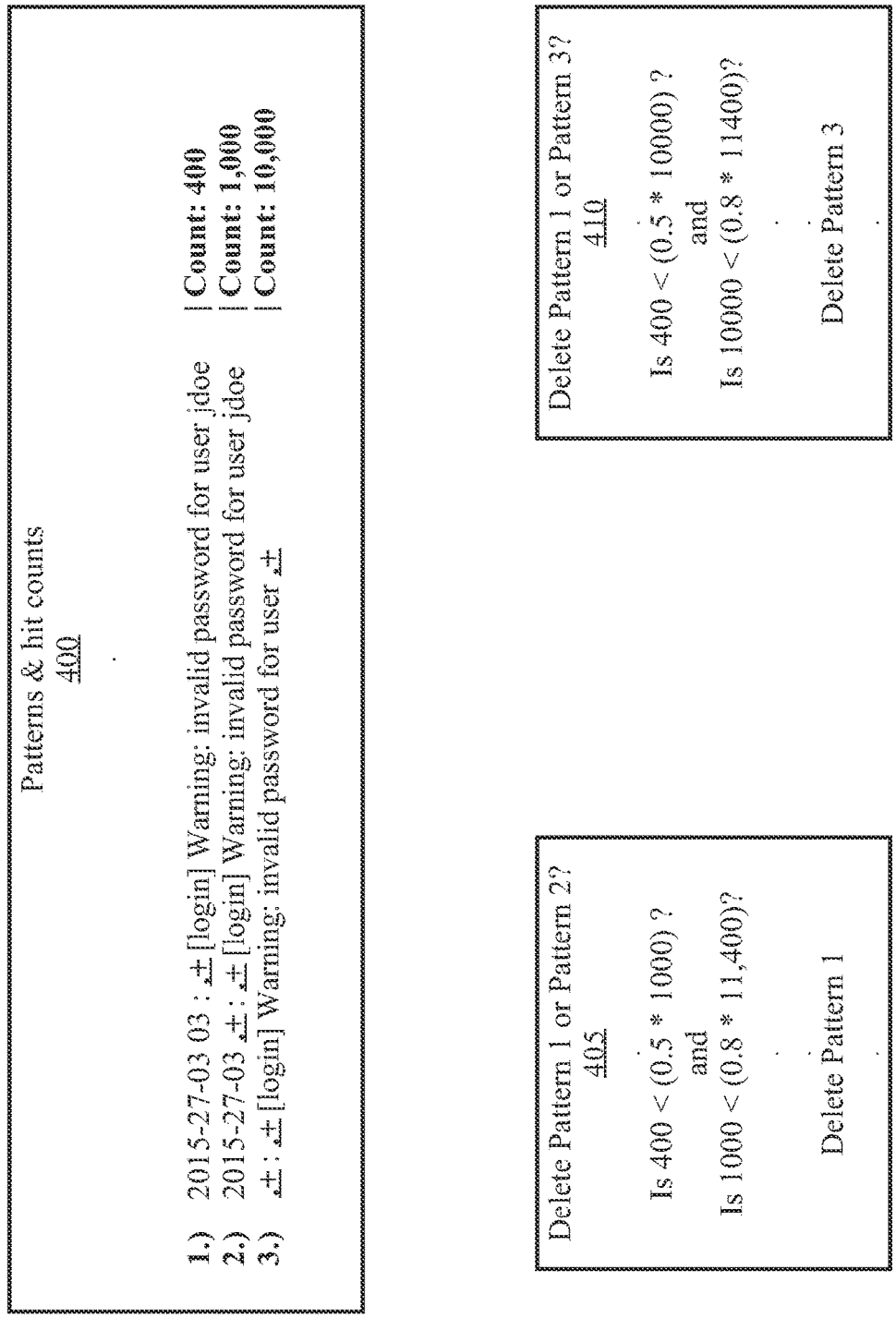
FIG. 4 shows an example in accordance with an embodiment of the invention.

FIG. 4 shows an example use case for log common subsequence discovery. The example shown in FIG. 4 has been greatly simplified, to ease understanding and, as such, the example should not be construed to limit the disclosure to the specifics discussed below.

Turning to the example, FIG. 4 shows patterns and hit counts 400. Specifically, in this example, logs have been received, tokenized, and the computed patterns are shown. Pattern 1 is: 2015-27-03 03:.+ [login] Warning: invalid password for user jdoe. Pattern 2 is: 2015-27-03 .+ :.+ [login] Warning: invalid password for user jdoe. Pattern 3 is .+ :.+ [login] Warning: invalid password for user .+. As shown, Pattern 1 has a hit count of 400, Pattern 2 has a hit count of 1,000, and Pattern 3 has a hit count of 10,000. Generally speaking, when viewing the patterns, Pattern 1 shows that user jdoe unsuccessfully tried 400 times to access his or her account within the past hour. Pattern 2 shows that user jdoe unsuccessfully tried 1,000 times to access his or her account within the past day. Pattern 3 shows that all time, users have unsuccessfully tried 10,000 to access their accounts. Pattern 3 is very general, and provides a limited amount of insight. However, Pattern 1 and 2 may provide insight that an attempted brute force attack is under way. Said another way, Pattern 1 is the most specific of the three patterns, while pattern 3 is the most general of the three patterns. As a simple measure of quality, the constant length of each pattern could be used, excluding spaces. This would result in a quality of 54 for Pattern 1, a quality of 52 for Pattern 2, and a quality of 38 for Pattern 3. Patterns 1-3 are also in a hierarchal relationship for some inputs. For example, if user jdoe were to unsuccessfully try to access his or her account for the 401$^{st}$ time, that error log would match all three patterns.

At 405, a decision is shown whether to delete Pattern 1 or 2 because the pattern database is full. For simplicity and ease of explanation, Pattern 3 is ignored in explaining item 405. The formula used to make the determination in this example is: Delete P1 if: P1 hit count<(0.5*P2 hit count) AND P2 hit count<(0.8*total hit count). Filling in the numbers for the example results in: 400<(0.5*1,000) AND 1000<(0.8*11,400), which simplifies to: 400<500 AND 1,000<9,120. Because both of these statements are true, Pattern 1 is deleted from the pattern database.

At 410, a decision is shown whether to delete Pattern 1 or Pattern 3. For simplicity and ease of explanation, Pattern 2 is ignored in explaining item 410. The formula used to make the determination in this example is: Delete P1 if: P1 hit count<(0.5*P3 hit count) AND P3 hit count<(0.8*total hit count). Filling in the numbers for the example results in: 400<(0.5*10,000) AND 10,000<(0.8*11,400), which simplifies to: 400<5,000 AND 10,000<9,120. Because 10,000 is not less than 9,120, and therefore both statements are not true, Pattern 1 is not deleted. Instead, Pattern 3 is deleted from the pattern database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
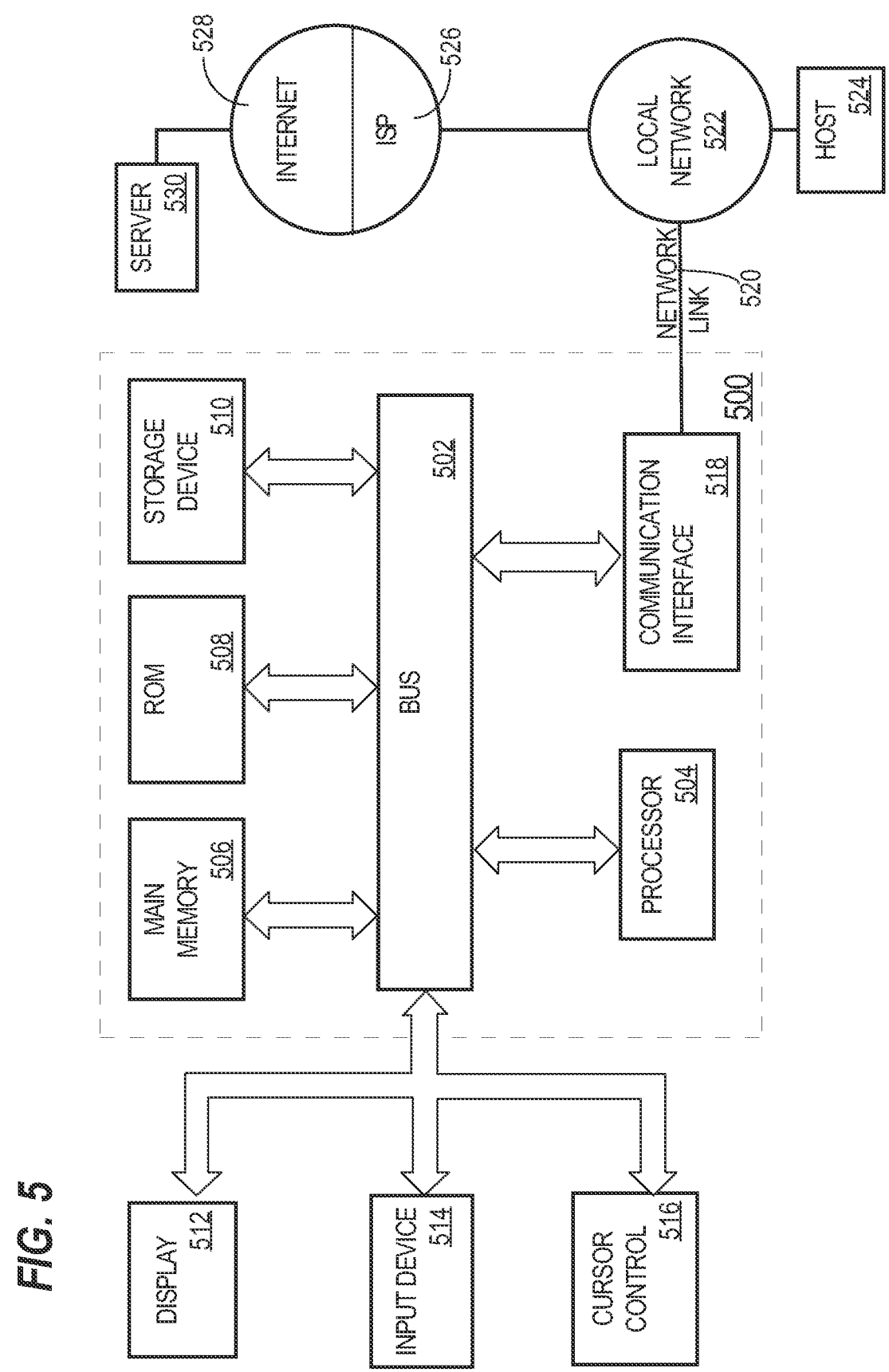
FIG. 5 shows a block diagram of a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using a computer, receiving a stream of digital data comprising a plurality of objects;

using programmed tokenizer instructions executed using the computer, in response to receiving a first object of the plurality of objects, tokenizing the first object to create a first tokenized object and electronically digitally storing the first tokenized object in a token database that comprises a plurality of other tokenized objects and using an electronic digital storage device;

using the computer, comparing the first tokenized object to the plurality of other tokenized objects stored in the token database, computing a first pattern including the first tokenized object having a constant sequence placed within characters of the first tokenized object, wherein the constant sequence identifies a subsequence of characters in at least two objects of the plurality of objects that are different, and storing the first pattern in a pattern database that comprises a plurality of patterns;

using the computer, managing a size of the pattern database by:

identifying, from the plurality of patterns, a subset of patterns that are eligible for deletion from the pattern database based on an age of each pattern and storing in computer memory data identifying the subset of patterns;

ranking each pattern of the subset based on a quality metric and a popularity metric, by marking the data identifying the subset of patterns with rank values, wherein the popularity metric is a hit count of an associated pattern, and wherein the quality metric comprises a function of a length of the constant sequence placed within characters of a tokenized object of an associated pattern;

identifying a lowest ranked pattern from the subset for deletion including determining a longest length of the constant sequence placed within characters of a tokenized object of an associated pattern; and repeating the tokenizing, comparing and storing using the updated database;

wherein the method is executed using one or more computing devices.

2. The method of claim 1, wherein the token database is a fixed size circular buffer.

3. The method of claim 1, wherein the first pattern is computed using a longest subsequence match algorithm.

4. The method of claim 1, wherein the size is between 25 and 1000 patterns.

5. The method of claim 1, wherein the age further comprises a grace period based on the size of the pattern database and a number of new patterns added to the pattern database after a pattern associated with the age, wherein the pattern associated with the age is not eligible for deletion during the grace period.

6. The method of claim 1, wherein the quality metric comprises a function of a ratio of the constant sequence length and a total length of a pattern.

7. The method of claim 1, wherein the plurality of objects are not pre-defined.

8. A method comprising:

using a computer, managing a size of a pattern database that stores a plurality of patterns, each pattern of the plurality of patterns including a tokenized object having a constant sequence placed within characters of the first tokenized object, wherein the constant sequence identifies a subsequence of characters in at least two objects that are different, by:

identifying, from the plurality of patterns, a subset of patterns that are eligible for deletion from the pattern database based on an age of each pattern and storing in computer memory data identifying the subset of patterns;

ranking each pattern of the subset based on a quality metric and a popularity metric, by marking the data identifying the subset of patterns with rank values, wherein the popularity metric is a hit count of an associated pattern, and wherein the quality metric comprises a function of a length of the constant sequence placed within characters of a tokenized object of an associated pattern;

identifying a lowest ranked pattern from the subset for deletion including determining a longest length of the constant sequence placed within characters of a tokenized object of an associated pattern; and deleting the pattern from the pattern database to produce an updated database;

wherein the method is executed using one or more computing devices.

9. The method of claim 8, wherein the size is between 25 and 1000 patterns.

10. The method of claim 8, wherein the age further comprises a grace period based on the size of the pattern database and an amount of new patterns added to the pattern database after a pattern associated with the age, wherein the pattern associated with the age is not eligible for deletion during the grace period.

11. A computing device comprising:

one or more processors; and one or more non-transitory computer-readable media storing computer-executable instructions that, when executed by the one or more processors, cause the one or more processors to:

receive a stream of digital data comprising a plurality of objects;

in response to receiving a first object of the plurality of objects, tokenize the first object to create a first tokenized object and electronically digitally store the first tokenized object in a token database that comprises a plurality of other tokenized objects and using an electronic digital storage device;

compare the first tokenized object to the plurality of other tokenized objects stored in the token database, computing a first pattern including the first tokenized object having a constant sequence placed within characters of the first tokenized object, wherein the constant sequence identifies a subsequence of characters in at least two objects of the plurality of objects that are different, and storing the first pattern in a pattern database that comprises a plurality of patterns;

manage a size of the pattern database by:

identifying, from the plurality of patterns, a subset of patterns that are eligible for deletion from the pattern database based on an age of each pattern and storing in computer memory data identifying the subset of patterns;

ranking each pattern of the subset based on a quality metric and a popularity metric, by marking the data identifying the subset of patterns with rank values, wherein the popularity metric is a hit count of an associated pattern, and wherein the quality metric comprises a function of a length of the constant sequence placed within characters of a tokenized object of an associated pattern;

identifying a lowest ranked pattern from the subset for deletion including determining a longest length of the constant sequence placed within characters of a tokenized object of an associated pattern; and repeating the tokenizing, comparing and storing using the updated database.

12. The computing device of claim 11, wherein the token database is a fixed size circular buffer.

13. The computing device of claim 11, wherein the first pattern is computed using a longest subsequence match algorithm.

14. The computing device of claim 11, wherein the size is between 25 and 1000 patterns.

15. The computing device of claim 11, wherein the age further comprises a grace period based on the size of the pattern database and a number of new patterns added to the pattern database after a pattern associated with the age, wherein the pattern associated with the age is not eligible for deletion during the grace period.

16. The computing device of claim 11, wherein the quality metric comprises a function of a ratio of the constant sequence length and a total length of a pattern.

17. The computing device of claim 11, wherein the plurality of objects are not pre-defined.

* * * * *